United States Patent
Tao et al.

(10) Patent No.: US 9,066,025 B2
(45) Date of Patent: Jun. 23, 2015

(54) CONTROL OF FREQUENCY LIFTING SUPER-RESOLUTION WITH IMAGE FEATURES

(71) Applicant: Samsung Electronics Co., Ltd., Suwon-si, Gyeonggi-do (KR)

(72) Inventors: Li Tao, Irvine, CA (US); Yeong-Taeg Kim, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

(21) Appl. No.: 14/214,348

(22) Filed: Mar. 14, 2014

(65) Prior Publication Data

US 2014/0267922 A1 Sep. 18, 2014

Related U.S. Application Data

(60) Provisional application No. 61/794,627, filed on Mar. 15, 2013, provisional application No. 61/892,332, filed on Oct. 17, 2013, provisional application No. 61/892,358, filed on Oct. 17, 2013, provisional application No. 61/892,374, filed on Oct. 17, 2013, provisional application No. 61/892,377, filed on Oct. 17, 2013.

(51) Int. Cl.
*H04N 9/67* (2006.01)
*H04N 5/265* (2006.01)

(52) U.S. Cl.
CPC ..................................... *H04N 5/265* (2013.01)

(58) Field of Classification Search
USPC ................... 348/625–631; 382/266, 299–301
See application file for complete search history.

(56) References Cited

U.S. PATENT DOCUMENTS

| | | | |
|---|---|---|---|
| 5,231,677 A * | 7/1993 | Mita et al. | 382/266 |
| 6,985,636 B1 * | 1/2006 | Semenchenko | 382/266 |
| 7,221,761 B1 * | 5/2007 | Deshpande et al. | 380/216 |
| 7,817,872 B2 * | 10/2010 | Michel et al. | 382/266 |
| 8,472,724 B2 * | 6/2013 | Lertrattanapanich et al. | 382/205 |
| 8,594,452 B2 * | 11/2013 | Chen | 382/266 |
| 2003/0112374 A1 * | 6/2003 | Wang et al. | 348/625 |
| 2004/0081366 A1 * | 4/2004 | Monobe et al. | 382/261 |

(Continued)

FOREIGN PATENT DOCUMENTS

| EP | 2416557 A1 | 2/2012 |
|---|---|---|
| KR | 1020110032402 A | 3/2001 |

(Continued)

OTHER PUBLICATIONS

International Search Report and Written Opinion dated Jul. 22, 2014 for International PCT Application No. PCT/KR2014/002246 from Korean Intellectual Property Office, pp. 1-9, Daejeon, Republic of Korea.

(Continued)

*Primary Examiner* — Jefferey Harold
*Assistant Examiner* — Human Satti
(74) *Attorney, Agent, or Firm* — Sherman IP LLP; Kenneth L. Sherman; Steven Laut

(57) ABSTRACT

Input image information is received. A processor device is used for determining enhancement information based on frequency characteristics and feature information of the input image information. The enhancement information is mixed with the input image information to generate an enhanced image.

30 Claims, 11 Drawing Sheets

(56) References Cited

U.S. PATENT DOCUMENTS

| | | | |
|---|---|---|---|
| 2004/0223662 A1* | 11/2004 | Urano et al. | 382/299 |
| 2006/0034539 A1* | 2/2006 | Nachlieli et al. | 382/260 |
| 2008/0008396 A1* | 1/2008 | Kisilev et al. | 382/272 |
| 2008/0025643 A1* | 1/2008 | Kubota et al. | 382/298 |
| 2008/0260278 A1* | 10/2008 | Zuo et al. | 382/251 |
| 2008/0291332 A1* | 11/2008 | Messing et al. | 348/625 |
| 2009/0040376 A1* | 2/2009 | Kobayashi | 348/452 |
| 2009/0116763 A1* | 5/2009 | Hwang et al. | 382/266 |
| 2010/0119176 A1* | 5/2010 | Ichihashi et al. | 382/300 |
| 2010/0183238 A1 | 7/2010 | Ayzenberg et al. | |
| 2010/0322513 A1 | 12/2010 | Xu et al. | |
| 2010/0322536 A1* | 12/2010 | Tezuka | 382/300 |
| 2011/0200270 A1* | 8/2011 | Kameyama | 382/260 |
| 2011/0222786 A1* | 9/2011 | Carmel et al. | 382/224 |
| 2011/0235939 A1 | 9/2011 | Peterson et al. | |
| 2012/0212573 A1 | 8/2012 | Park | |
| 2012/0219229 A1* | 8/2012 | Springer et al. | 382/199 |
| 2012/0288210 A1* | 11/2012 | Chen et al. | 382/233 |
| 2012/0301049 A1* | 11/2012 | Mori | 382/266 |
| 2013/0121611 A1* | 5/2013 | Moriya et al. | 382/266 |
| 2013/0127837 A1* | 5/2013 | Hyodo et al. | 345/419 |
| 2014/0003734 A1* | 1/2014 | Umansky et al. | 382/275 |
| 2014/0267347 A1 | 9/2014 | Tao et al. | |
| 2014/0270564 A1 | 9/2014 | Tao et al. | |
| 2014/0270566 A1 | 9/2014 | Tao et al. | |

FOREIGN PATENT DOCUMENTS

| | | |
|---|---|---|
| KR | 1020050047373 A | 5/2005 |
| KR | 1020050048529 A | 5/2005 |
| WO | 2011068360 A2 | 6/2011 |

OTHER PUBLICATIONS

Piao, Y. et al., "Image resolution enhancement using inter-subband correlation in wavelet domain", Proceedings of the 2007 International Conference on Image Processing (ICIP 2007), 16 Sep. 20078-Oct. 19, 2007, pp. 445-448, vol. 1, IEEE, United States.

International Search Report and Written Opinion dated Jul. 7, 2014 for International PCT Application No. PCT/KR2014/002247 from Korean Intellectual Property Office, pp. 1-8, Daejeon, Republic of Korea.

* cited by examiner

CONTROL OF FREQUENCY LIFTING SUPER-RESOLUTION WITH IMAGE FEATURES

CROSS-REFERENCE TO RELATED APPLICATIONS

This application claims the priority benefit of U.S. Provisional Patent Application Ser. No. 61/794,627, filed Mar. 15, 2013, U.S. Provisional Patent Application Ser. No. 61/892,332, filed Oct. 17, 2013, U.S. Provisional Patent Application Ser. No. 61/892,358, filed Oct. 17, 2013, U.S. Provisional Patent Application Ser. No. 61/892,374, filed Oct. 17, 2013, and U.S. Provisional Patent Application Ser. No. 61/892,377, filed Oct. 17, 2013, all incorporated herein by reference in their entirety.

TECHNICAL FIELD

One or more embodiments relate generally to ultra-high definition (UD) displays, and in particular, to detail restoration using gain control based on image features to reduce potential image artifacts for images for display on a UD display or device.

BACKGROUND

UD users, such as UD television (UDTV) or other UD display devices have to watch lower resolution content (e.g., standard definition (SD), high-definition (HD), Full HD (FHD), etc. content on UD devices until UD video becomes more prevalent. The image quality of lower resolution frames looks degraded when viewed on UD devices. Regular image upscaling or interpolation is unable to provide sufficient image sharpness and fine details to minimize the image quality degradation.

SUMMARY

One or more embodiments relate to reducing potential image artifacts for an image. In one embodiment, a method includes receiving an input image. In one embodiment, a processor device is used for determining enhancement information based on frequency characteristics and feature information of the input image information. In one embodiment, the enhancement information is mixed with the input image information to generate an enhanced image.

In one embodiment, a system comprises an image feature detection module that obtains feature information for an input image. In one embodiment, an image processing module uses a processor device for: receiving input image information, and determining enhancement information based on the feature information and frequency characteristics of the input image information. In one embodiment, a mixer module mixes the enhancement information with the input image.

In one embodiment, a non-transitory computer-readable medium having instructions which when executed on a computer perform a method. In one embodiment, the method comprises receiving an input image. In one embodiment, enhancement information is determined based on frequency characteristics and feature information of the input image information. In one embodiment, the enhancement information is mixed with the input image information to generate an enhanced image.

These and other features, aspects and advantages of the one or more embodiments will become understood with reference to the following description, appended claims and accompanying figures.

DETAILED DESCRIPTION

Figure 1:
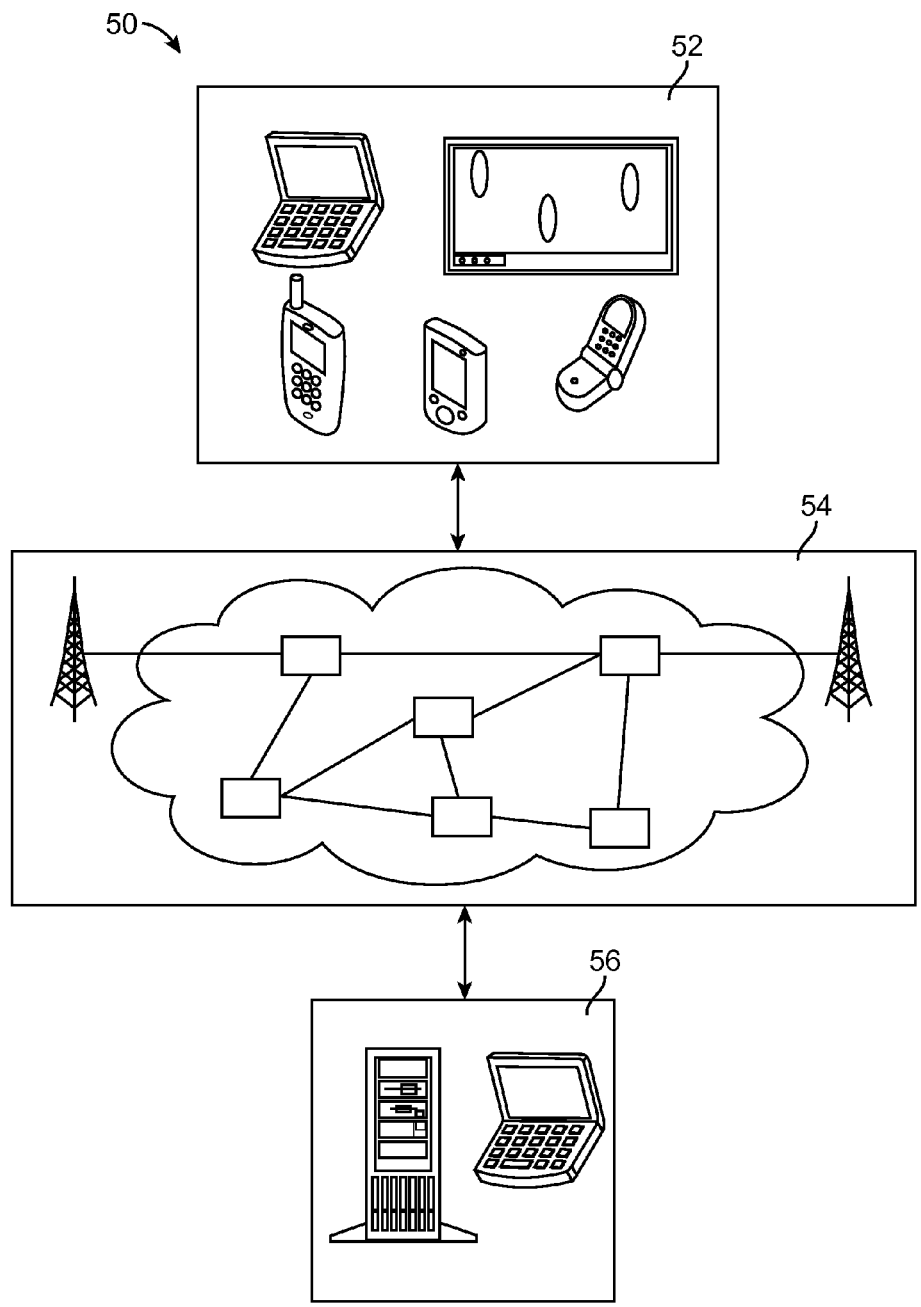
FIG. 1 shows an electronic system with an image details creation mechanism, according to one embodiment.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments provide for reducing potential image artifacts for an image. In one embodiment, a method includes receiving an input image. In one embodiment, a processor device is used for determining enhancement information based on frequency characteristics and feature information of the input image information. In one embodiment, the enhancement information is mixed with the input image information to generate an enhanced image.

A person skilled in the art would appreciate that the format with which image information is expressed is not critical to some embodiments. For example, in some embodiments, image information is presented in the format of (X, Y), where X and Y are two coordinates that define the location of a pixel in an image. Three-dimensional image information is presented by a format of (X, Y, Z) with related information for color of the pixel. In one embodiment, the three-dimensional image information also includes an intensity or brightness element.

For expository purposes, the term "horizontal" as used herein refers to the horizontal direction seen when viewing the drawing as indicated by the figure designation of "FIG.". The term "vertical" refers to a direction perpendicular to the horizontal as just defined. Terms, such as "above", "below", "bottom", "top", "side", "higher", "lower", "upper", "over", and "under", are defined with respect to the horizontal, as shown in the figures.

The term "image" referred to herein may include a two-dimensional image, three-dimensional image, video frame, a computer file representation, an image from a camera, a video frame, or a combination thereof. For example, the image may be a machine readable digital file, a physical photograph, a digital photograph, a motion picture frame, a video frame, an x-ray image, a scanned image, or a combination thereof. The image may be generated from pixels arranged in a rectangular array. The image may include an x-axis along the direction of the rows and a y-axis along the direction of the columns.

FIG. 1 shows an electronic system 50 with an image details creation mechanism in one or more embodiments. The electronic system 50 includes a first device 52, such as a client or a server, connected to a second device 56, such as a client or server. The first device 52 may communicate with the second device 56 with a communication path 54, such as a wireless or wired network.

In one example, the first device 52 may be of any of a variety of ultra-high definition (UD) display devices, such as a UD television (UDTV), tablet device, smart phone, personal digital assistant (PDA), a notebook computer, a liquid crystal display (LCD) system, a wearable device, mobile computing device, or other multi-functional displays or entertainment devices. The first device 52 may couple directly or indirectly to the communication path 54 to communicate with the second device 56 or may be a stand-alone device.

For illustrative purposes, the display system 50 is described with the first device 52 as a display device, although it is understood that the first device 52 may be different types of devices. For example, the first device 52 may also be a device for presenting images or a multi-media presentation. A multi-media presentation may be a presentation including sound, a sequence of streaming images or a video feed, or a combination thereof. As an example, the first device 52 may be a UDTV, or any other type of UD display device (e.g., monitor, video panel, HUD, smart telephone, tablet device, video device, gaming device, etc.).

The second device 56 may be any of a variety of centralized or decentralized computing devices, image or video transmission devices. For example, the second device 56 may be a multimedia computer, a tablet, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, a recording device, such as a camera or video camera, or a combination thereof. In another example, the second device 56 may be a signal receiver for receiving broadcast or live stream signals, such as a television receiver, a cable box, a satellite dish receiver, or a web enabled device.

The second device 56 may be centralized in a single room, distributed across different rooms, distributed across different geographical locations, embedded within a telecommunications network. The second device 56 may have a means for coupling with the communication path 54 to communicate with the first device 52.

For illustrative purposes, the electronic system 50 is described with the second device 56 as a computing device, although it is understood that the second device 56 may be different types of devices. Also for illustrative purposes, the display system 50 is shown with the second device 56 and the first device 52 as end points of the communication path 54, although it is understood that the display system 50 may have a different partition between the first device 52, the second device 56, and the communication path 54. For example, the first device 52, the second device 56, or a combination thereof may also function as part of the communication path 54.

The communication path 54 may be a variety of networks. For example, the communication path 54 may include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that may be included in the communication path 54. Ethernet, digital subscriber line (DSL), fiber to the home (FTTH), high-definition multimedia interface (HDMI) cable, and plain old telephone service (POTS) are examples of wired communication that may be included in the communication path 54.

Further, the communication path 54 may traverse a number of network topologies and distances. For example, the communication path 54 may include direct connection, personal area network (PAN), local area network (LAN), metropolitan area network (MAN), wide area network (WAN), or a combination thereof.

Figure 2:
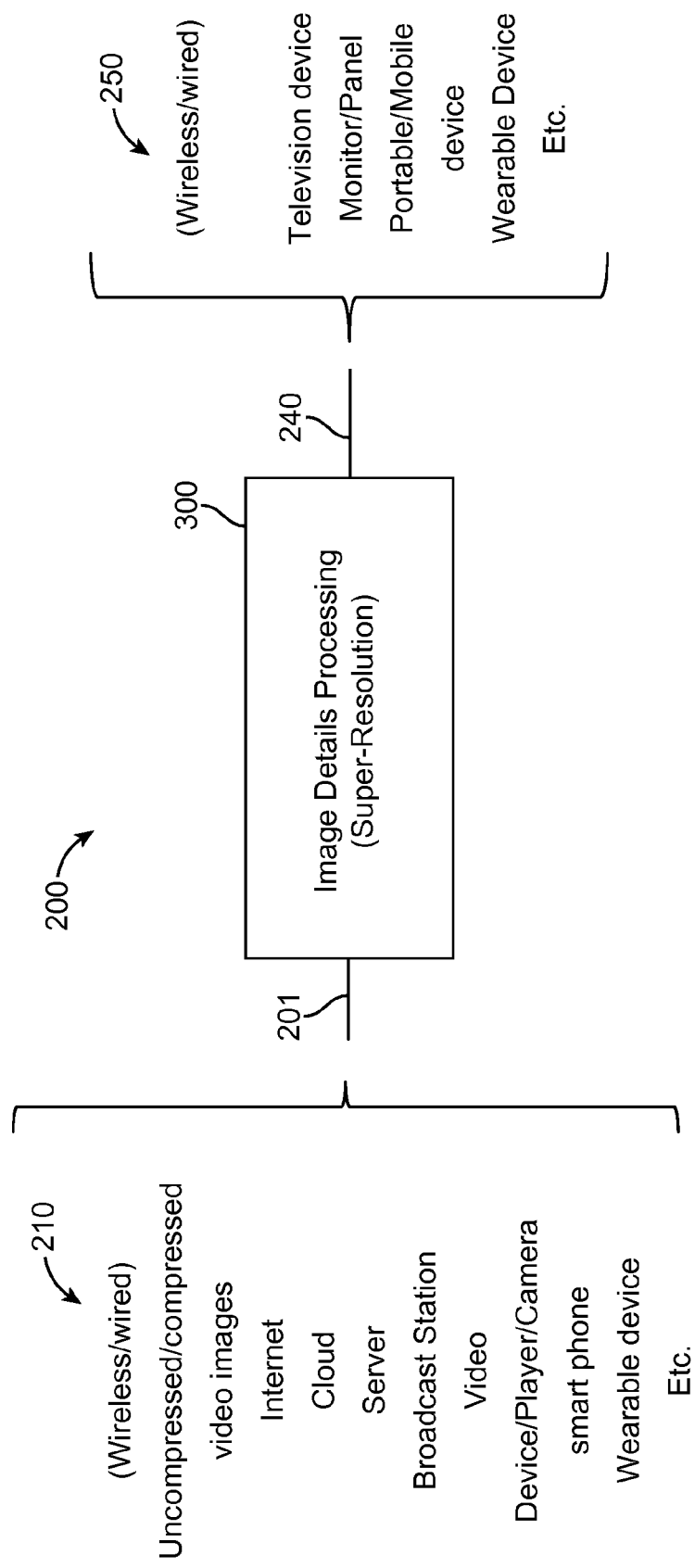
FIG. 2 shows an example high-level block diagram of a system, according to one embodiment.

FIG. 2 shows a high-level block diagram of a system 200, according to one embodiment. In one embodiment, the system 200 may process input video images from an input source 210 received at an input node 201 using an image details processing system or module 300 (see FIG. 3), output video images at the output node 240 and display the images on an output source 250 (or device 52, FIG. 1). In one embodiment, the image details processing system 300 receives input image information. In one embodiment, a processor device of the details processing system 300 is used for determining enhancement information based on frequency characteristics and feature information of the input image information. In one embodiment, the enhancement information is then mixed with the input image information to generate an enhanced image. In one embodiment, the display for an output source 250 (or 52) may be a physical device for presenting the image or multi-media presentations. For example, the display may be a screen, including a liquid crystal display (LCD) panel, a plasma screen, a projection screen, a heads-up-display (HUD), etc. In other embodiments, the display may be projected on an object or reflection device.

In one embodiment, the input video images may be provided from an input source 210, which may be transmitted/received wirelessly or through a wired interface and may include uncompressed/compressed video content. In one embodiment, wireline or wireless communication of video imaging content in system 200 may include communication on/over one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1× enhanced voice-data only (EV-DO) or 1×EV-DO Gold Multicast) system, an IEEE 802.11 system, a DMB (Digital Multimedia Broadcasting) system, an orthogonal frequency division multiple access (OFDM) system, a DVB-H (Digital Video Broadcasting-Handheld) system, etc.

In one embodiment, the video input source 210 may be transmitted over a wireless network (e.g., Internet, local area network (LAN), wide-area network (WAN), personal area network (PAN), campus wireless network (CAN), metropolitan area network (MAN), etc.). In one embodiment, the input source 210 may arise from a cloud-based system, a server, a broadcast station, a video device/player, a video camera, a mobile device, etc.

In one embodiment, the video image input from the input source may be decoded/encoded (e.g., via a decoder/encoder) prior to arriving at the input node 201. In one embodiment, the video image output from the output node 240 to an output source 250 may be encoded/decoded prior to arriving at the output node 240. In one embodiment, the output source 250 may receive the output image from the output node 240 wirelessly or through a wire interface.

In one embodiment, compressed video image content from an input source 210 may provide analog or digital video from a broadcast, computer network, a DVD or other computer readable storage medium, or any other suitable source of video signals. In one embodiment, the compressed video from an input source 210 may be coupled to a receiver via a radio frequency interface (such as ATSC broadcasts), a computer network, or a wired or wireless connection such as a component video cable, a DVI or HDMI video interface, etc. In one embodiment, an uncompressed video image from an input source 210 may include one or more of a video camera, or a memory device such as a disk drive coupled to a receiver by any suitable video interface. In one embodiment, the uncompressed video from an input source 210 may provide uncompressed video in analog or digital form including in the form of luminance and chrominance, in individual color intensities such as red, green and blue, etc., or in any other suitable format.

In one embodiment, digital video formats for input video content from an input source 210 may include different frame rates, different numbers of lines and rows of pixels, interlaced and non-interlaced, etc. For example, movies are typically produced at 24 fps (frames per second) format, NTSC is 30 frames per second and PAL is 25 frames per second. The format may be interlaced or progressive. For example, high definition formats (such as supported by digital video broadcast standards) may be modified to a format that fits the format of a display device of an output source 250. The display device of an output source 250 may be configured to receive NTSC, PAL, ATSC, DVB/T, etc.), or display device running at frame rates, such as 70 Hz, 75 Hz, 80 Hz, etc.

Figure 3:
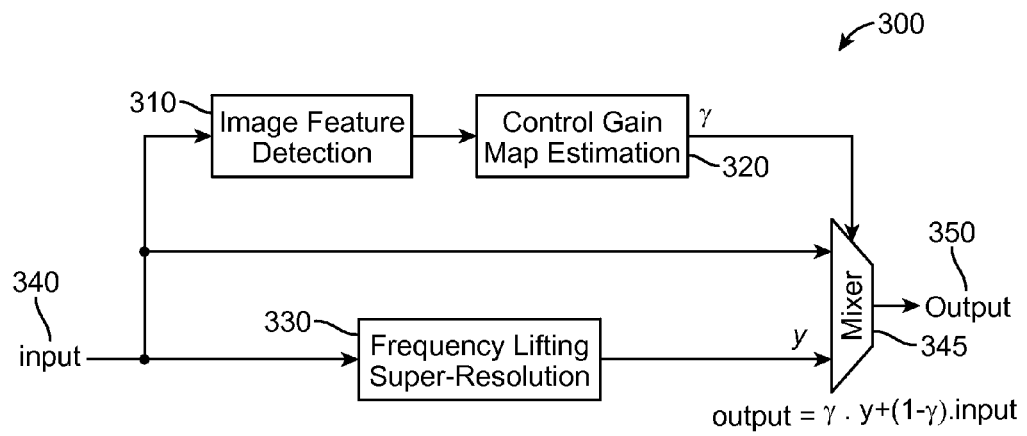
FIG. 3 shows a block diagram of an image processing system, according to an embodiment.

FIG. 3 shows a block diagram of an image processing system 300, according to an embodiment. In one embodiment, the system 300 includes an image feature detection module 310, a control gain map estimation/generator module 320, a frequency lifting super-resolution (FLSR) module 330 and a mixing/mixer module 345. In one embodiment, the system 300 includes an input node 340 for inputting an input image, and an output node 350 for outputting an output image. In one embodiment, the system 300 may be implemented in an electronic device, such as the first device 52 (FIG. 1), the second device 56, etc.

In one embodiment, block based image processing is implemented to produce the output image at the output node 350, which is a result of processing the output from the control gain map estimation/generator module 320 with the input image and the output of the FLSR module 330, which is an enhanced version of the input image that contains enhanced and restored high frequency information (details) that may be adjusted based on texture or edge information. In one embodiment, the FLSR module 330 includes frequency lifting and image processing, which results in an output image as described with reference to in FIGS. 9-17 below, and with reference to the systems, processes and modules in the following co-pending applications: U.S. Ser. No. 14/214,056 filed on Mar. 14, 2014 having a title of "CREATING DETAILS IN AN IMAGE WITH FREQUENCY LIFTING", U.S. Ser. No. 14/214,081 filed on Mar. 14, 2014 having a title of "CREATING DETAILS IN AN IMAGE WITH ADAPTIVE FREQUENCY STRENGTH CONTROLLED TRANSFORM", and U.S. Ser. No. 14/214,114 filed on Mar. 14, 2014 having a title of "CREATING DETAILS IN AN IMAGE WITH ADAPTIVE FREQUENCY LIFTING", which contents are each incorporated herein by reference in their entirety.

In one example embodiment, if a regular image up-conversion block is added in front of system 300, it may be applied to generate UD images (still images or video frames) using lower resolution images as the input images (e.g., SD, HD, FHD, UD, up-scaled UD, etc.), which is an advanced image up-conversion/up-scaling/super-resolution system. In one example embodiment, up-converted UD images contain additional image details that cannot be obtained by conventional image up-conversion algorithms. As a result, in one or more embodiments the image quality (sharpness, fine details, etc.) may be greatly improved. In one embodiment, an application of system 300 may be implemented in a UD device or display on which a lower resolution movie may be received for display. If system 300 is not available on the UD device or display, the viewers may feel the image sharpness is poor or the image lacks delicate detail. Currently, UD video images (e.g., streaming video, movies, etc.) is available on the market, but UD video media (TV programming, web TV or video, Blu-ray discs and personal digital video) is extremely rare. Most of the video media is still FHD, HD or even SD. In one or more embodiments, to satisfy UD viewers' visual expectation, advanced image up-conversion (super-resolution) function is implemented using system 300.

In one embodiment, an application of the system 300 may be implemented in current HDTVs (or lower resolution TVs, devices, displays, etc.) to enhance (or restore) the image details of low quality SD, HD or FHD images of poor (blurry or degraded) image details, such as the web video clips obtained from the Internet or digital video captured by personal camcorder or smart phone. Usually low quality HD or FHD video clips' image details may be degraded or damaged due to data compression, insufficient lighting condition or limited performance of the video capture device. One or more embodiments provide system 300 as a versatile system that is able to achieve the required functions by different applications, either in hardware or software. In one example embodiment, applications for system 300 may include high performance image detail enhancement or restoration, image super-resolution, and advanced image up-conversion, etc. In one or more example embodiments, the applications of system 300 may be very useful if implemented as programmed hardware in UD devices and displays. HDTV products or as software used in PCs or mobile devices (tablets, PCs, wearable devices, smart phones, etc.).

In one embodiment, the output image from the FLSR module 330 is an enhanced version that contains lifted high frequency information (details) from the input image received at the input node 340.

In one embodiment, the system 300 provides artifact suppression using the image feature detection module 310, the output γ from the (pixel based) control gain map estimation/generator module 320, the input image, the output from the FLSR module 330 and the mixing/mixer module 345, which mixes the input image and the FLSR module 330 output based on the pixel based gain control value γ as follows:

output=γ·y+(1−γ)·input, where y is the output of the FLSR module 330 (enhanced signal) and γ (varies 0 to 1) is the gain control value from the control gain map estimation/generator module 320, which varies from pixel to pixel position based on local image features. In one example embodiment, it should be noted that the output image=the input image when γ=0, and that the output image=y when γ=1. Therefore, in one example embodiment, by properly adjusting the value of γ based on local image features, which may bring image artifacts to the FLSR module 330 output, the possible image artifacts of the FLSR module 330 may be suppressed.

Figure 4:
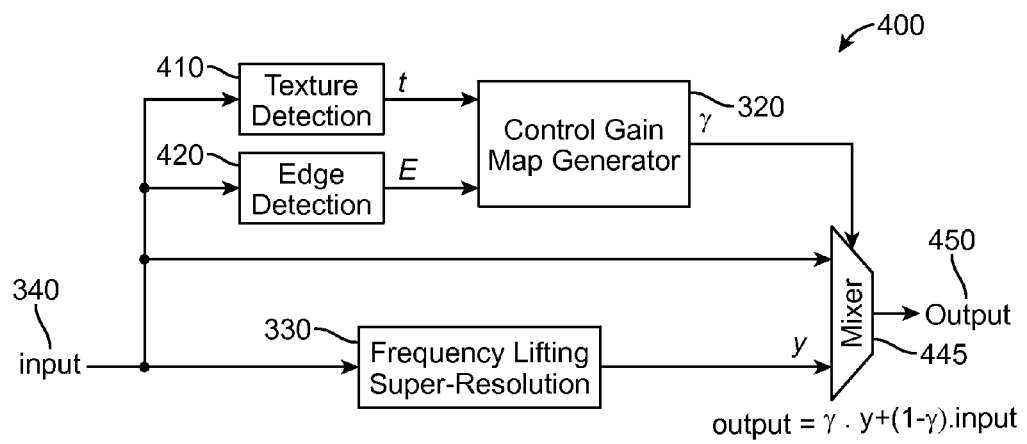
FIG. 4 shows an example block diagram of an image processing system including texture and edge detection, according to an embodiment.

FIG. 4 shows an example block diagram of an image processing system 400 including texture and edge detection, according to an embodiment. In one embodiment, the system 400 is similar to system 300 (FIG. 3) includes a texture detection module 410 and edge (sample) detection module 420 (in replace of the image feature detection module 310) and a mixing/mixer module 445. In one embodiment, the input node 340 receives an input image and the output node 450 outputs the output image that is processed by the system 400.

In one embodiment, texture and edge information are used as a way of detecting image features. In one embodiment, the edge detection may be performed, for example, by a Sobel operator. In one embodiment, the texture detection may be performed, for example, by counting zero crossing points (N) in local windowed samples. In one embodiment, based on the output, t, of the texture detection module 410, and the output, E, of the edge detection module 420, the control gain map estimation/generator module 320 generates a γ-map, which is determined as follows: γ=(1−E)·((1−t)+K·t), where K 510 (FIG. 5) is greater or equal to one (i.e., ≥1).

In one embodiment, based on the relation among the various quantities of E, t and K, it may be determined that for texture-rich blocks (e.g., larger N values), more frequency components (due to a lower K value) will be lifted, and the lifting is larger (i.e., due to a larger number of artifacts), which properly deals with two cases. In one embodiment, first, texture-rich regions are generally filled with image details that need to be enhanced or restored; second, texture-poor blocks may make the artifacts easier to be seen.

Figure 5:
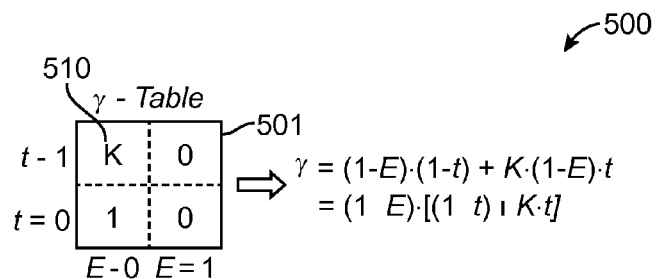
FIG. 5 shows an example mapping, according to an embodiment.

FIG. 5 shows an example mapping 500, according to an embodiment. In one embodiment, the γ table 501 shows an example M×N element/pixel block where M=N=2. In one embodiment, the γ table generates the values for γ based on the values of E, t and K, as indicated by the following:

$$Y = (1-E)\cdot((1-t) + K\cdot t)$$
$$= (1-E)\cdot[(1-t) + K\cdot t].$$

Figure 6:
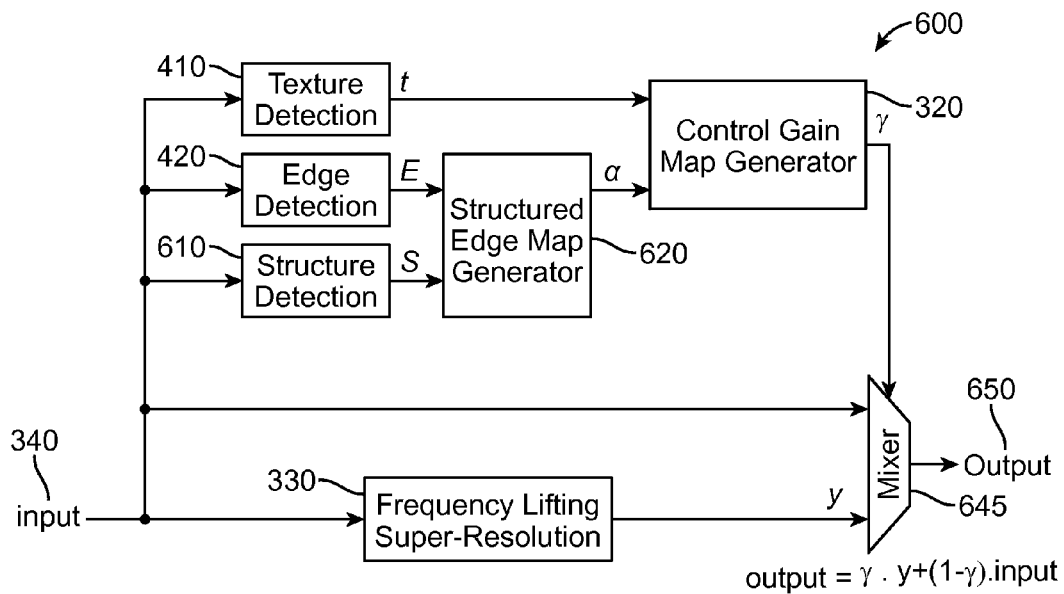
FIG. 6 shows a block diagram of an image processing system including structure detection, according to an embodiment.

FIG. 6 shows a block diagram of an image processing system 600 including structure detection, according to an embodiment. In one embodiment, the system 600 is similar to system 400 (FIG. 4) with the inclusion of the structure detection module 610, the structured edge map generator module 620 and the mixing/mixer module 645 that has an output image based on γ·y+(1−γ)·input image.

In one embodiment, the structure detection module 610 may estimate structure/shape detection based on, for example, Principal Component Analysis (PCA) or Hough Transformation. In one embodiment, based on the edge map, E, and the structure detection module output, S, a new quantity denoted as the α-map is obtained. In one embodiment, the value of an element/pixel of the α-map is determined as α=(1−S)(1−E) as shown in FIG. 7 and described below with reference to FIG. 7.

Figure 7:
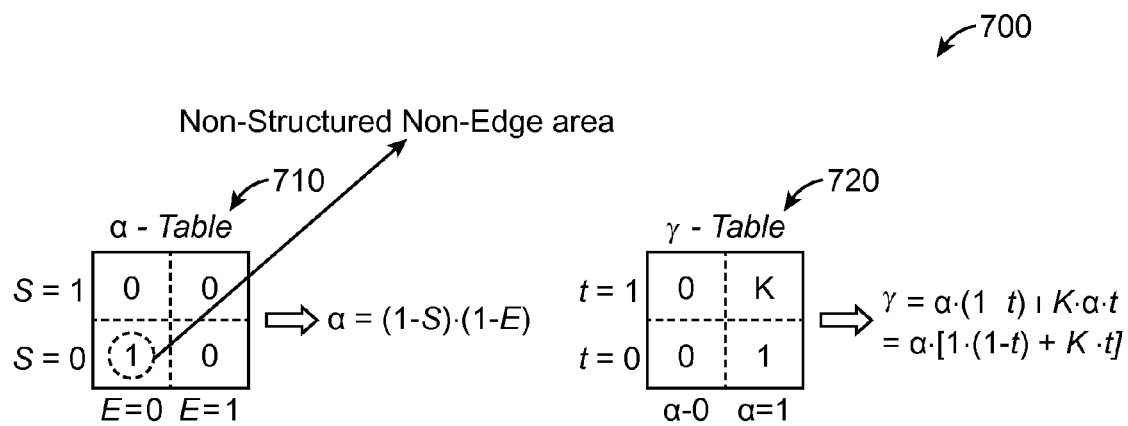
FIG. 7 shows an example mapping for detected edge, structure and texture information, according to an embodiment.

FIG. 7 shows an example mapping 700 for detected edge, structure and texture information, according to an embodiment. As shown, the example mapping includes the α map table 710 and the γ map table 720. In one embodiment, when α approaches 0 (e.g., E or S approaches 1), it is indicated that the pixel is related to either a strong edge pixel or a structure area. In one example embodiment, if α approaches 1 (both E and S approach 0), the pixel is not edge related and not a structured area.

In one embodiment, the structured edge map generator module 620 generates the α-map that is used by the control gain map estimator/generator module 320 to generate the γ-map. In one embodiment, the control gain map estimator/generator module 320 utilizes the α-map and texture map as follows: γ=α(1−t)+K·α·t, where K≥1 (as shown in the example mapping 700). In one embodiment, based on the graph of the relation between γ and (α, t) in a discrete example, it may be inferred that γ=K (highest contribution of an SR processed image) when α=1 (i.e., no strong edges) and t=1 (i.e., rich texture); γ=1 (i.e., modest contribution) when α=1 (i.e., no strong edges) and t=0 (i.e., poor texture); γ=0 (i.e., lowest/no contribution) when α=0 (i.e., strong edges). In one embodiment, the system 600 provides for artifact control based on reducing the contribution of strong-edge-related pixels (in an SR processed image) to the final output image at the output node 650 (FIG. 6) while maintaining or boosting the contribution of rich-texture-related pixels.

Figure 8:
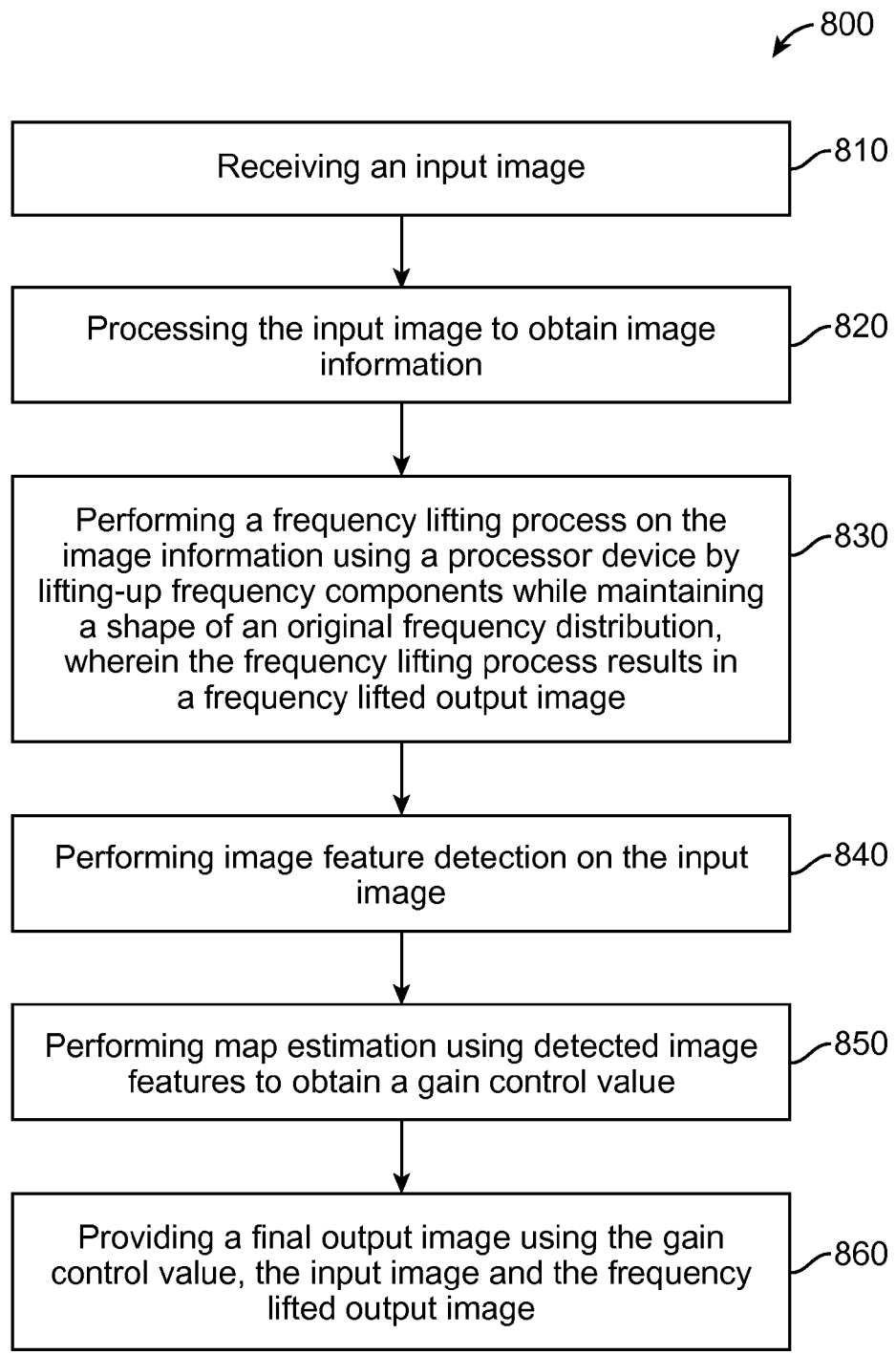
FIG. 8 shows a block diagram for a process for reducing potential image artifacts, according to an embodiment.

FIG. 8 shows a block diagram for a process 800 for reducing potential image artifacts for an image (e.g., an SR processed image), according to an embodiment. In one embodiment, in block 810, an input image (e.g., SD, HD, FHD, UD, up-scaled UD, etc.) is received (e.g., by an input image node 340, FIGS. 3, 4 and 6). In one embodiment, in block 820 the input image is processed to obtain image information (e.g., M×N blocks). In one embodiment, in block 830 a frequency lifting process (e.g., using system 900, FIG. 9, modified system 900 that uses edge information, a modified system 900 that uses texture information, etc.) is performed on the image information using a processor device by lifting-up frequency components. In one embodiment, the frequency lifting process results in a frequency lifted output image.

In one embodiment, in block 840 image feature detection is performed on the input image. In one embodiment, in block 850 map estimation is performed using detected image features to obtain a gain control value. In one embodiment, in block 860 a final output image is obtained using the gain control value, the input image and the frequency lifted output image.

In one embodiment, process 800 may further include using the processor device for transforming the image information for obtaining frequency domain information; performing an inverse transformation on an updated frequency distribution for creating one or more output image blocks; and combining the one or more output image blocks to create image details for a frequency lifted image, and mixing the frequency lifted image with the input image to obtain the output image. In one embodiment, the image information may be performed using SDFT, DCT, etc.) for obtaining frequency domain information (e.g., using a processor device). In one embodiment, edge information and/or texture information for the input image may be used for adjusting the frequency lifting process.

In one embodiment, process 800 the frequency domain information may include transform coefficients, and the frequency components are created based on: performing frequency lifting on the transform coefficients for lifting some (e.g., one or more, several, all, etc.) frequency components to a higher frequency location in a transform spectrum; and converting the transform coefficients to modified transform coefficients.

In one embodiment, process 800 the frequency domain information may include transform coefficients, and the frequency components are created based on: shifting the transform coefficients position in a matrix; using the shifted transform coefficients for determining distances for coefficients to a zero-frequency coefficient position using associated coefficient row and column indexes; performing frequency lifting on the transform coefficients based on the determined distances for lifting some (e.g., one or more, several, all, etc.) frequency components to a higher frequency location in a transform spectrum; and converting the transform coefficients to modified transform coefficients.

In one embodiment, process 800 may include moving the zero-frequency coefficient position to a center of the matrix after shifting, where the zero-frequency coefficient position is used as an origin of a two-dimensional coordinate, and matrix elements are used as points on the two-dimensional coordinate. In one embodiment, in process 800 distances may be determined for coefficients based on a pre-determined transfer function.

In one embodiment, in process 800 performing image feature detection on the input image may include detecting any of: edge information, texture information and structure information for the input image. In one embodiment, process 800 may include performing the frequency lifting process (e.g., using system 900, FIG. 9, modified system 900 that uses edge information, a modified system 900 that uses texture information, etc.) on the image information using the processor device by lifting-up frequency components while maintaining a shape of an original frequency distribution. In one embodiment, process 800 may include performing map estimation using detected image features using detected edge information and detected texture information to generate the gain control value.

In one embodiment, in process 800 performing map estimation using detected image features may include using detected edge information and detected structure information to generate a first map, and using the first map and the detected texture information to generate a second map, which may be used as the gain control value.

In one embodiment, in process 800 the final output image may be displayed on an electronic device (e.g., an electronic device 52, FIG. 1). In one embodiment, process 800 may perform processing on one of a local television device, a set-top-box device, and a network server device.

Figure 9:
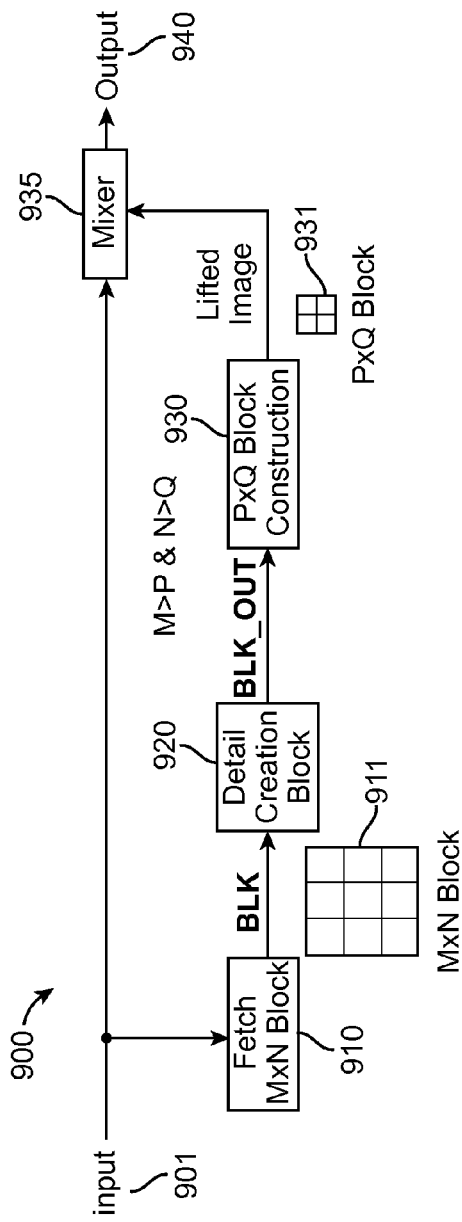
FIG. 9 shows a block diagram of an image details processing system, according to an embodiment.

FIG. 9 shows a block diagram of the image details processing system 900 that may be used for processing in the FLSR module 330 (FIG. 3), according to an embodiment. In one embodiment, the system 900 may be implemented in an electronic device, such as the first device 52 (FIG. 1), the second device 56, etc. In one embodiment, the system 900 includes an input node 901, a fetching/receiving module 910, a detail creation module 920, a block construction/combining module 930, a mixer module 935 (for mixing the lifted image details with an input image) and an output node 940.

In one embodiment, block based image processing is implemented to produce the output image at the output node 940, which is a combination of the input image from the input node 901 and its enhanced version that contains created high frequency information (details). In one embodiment, the details are created in the detail creation module 920 where image blocks 911 are fed in from the block receiving module 910 (that divides an input image into blocks), and the output detail blocks 931 are generated by the detail construction module 930 in which more output detail blocks are constructed to form a whole image details. In one embodiment, the output, which may be pixels or image blocks 931 (size P×Q), are generally smaller than the input image size of blocks 911 (size M×N), where P, Q, M and N are positive integers.

In one example embodiment, if a regular image up-conversion block is added in front of system 900, it may be applied to generate UD images (still images or video frames) using lower resolution images as the input images, which is an advanced image up-conversion/up-scaling/super-resolution system. In one example embodiment, up-converted UD images contain additional image details that cannot be obtained by conventional image up-conversion algorithms. As a result, in one or more embodiments the image quality (sharpness, fine details, etc.) may be greatly improved. In one embodiment, an application of system 900 may be implemented in a UD device or display on which a lower resolution movie may be received for display. If system 900 is not available on the UD device or display, the viewers may feel the image sharpness is poor or the image lacks delicate detail. Currently, UD video images (e.g., streaming video, movies, etc.) is available on the market, but UD video media (TV programming, web TV or video, Blu-ray discs and personal digital video) is extremely rare. Most of the video media is still FHD, HD or even SD. In one or more embodiments, to satisfy UD viewers' visual expectation, advanced image up-conversion (super-resolution) function is implemented using system 900.

In one embodiment, an application of the system 900 may be implemented in FLSR module 330 in current HDTVs (or lower resolution TVs, devices, displays, etc.) to enhance (or restore) the image details of low quality SD, HD, FHD, UD or up-scaled UD images of poor (blurry or degraded) image details, such as the web video clips obtained from the Internet or digital video captured by personal camcorder or smart phone. Usually low quality SD, HD or FHD video clips' image details may be degraded or damaged due to data compression, insufficient lighting condition or limited performance of the video capture device. One or more embodiments provide system 900 as a versatile system that is able to achieve the required functions by different applications, either in hardware or software. In one example embodiment, applications for system 900 employment in FLSR 330 may include high performance image detail enhancement or restoration, image super-resolution, and advanced image up-conversion, etc. In one or more example embodiments, various applications of system 900 may be very useful if implemented as programmed hardware in UD devices and displays, HDTV products or as software used in PCs or mobile devices (tablets, PCs, wearable devices, smart phones, etc.).

In one embodiment, the system 900 produces the output image at the output node 940, which is a combination of the input image from the input node 901 and its enhanced version that contains enhanced and restored high frequency information (details). The detail description of the detail creation module 920 for one or more embodiments follows in combination with FIGS. 10-17.

Figure 10:
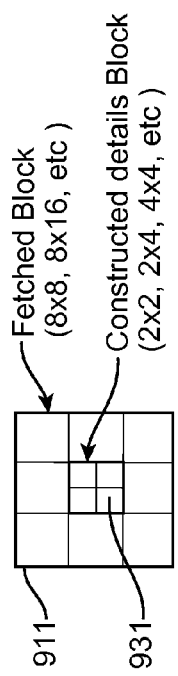
FIG. 10 shows an example relationship between an external image block and an internal image block, according to an embodiment.

FIG. 10 shows an example relationship between an external image block (made up of an M×N block 911) and an internal image block (made up of a P×Q block 931) that are center-aligned with one another, according to an embodiment. The common image block sizes and the spatial relationship between the input image block 911 and the output image block 931 is demonstrated in FIG. 10. In one embodiment, the output image block 931 is located as a center portion within the input image block 911. In one embodiment, while the output image block 931 is being created, both the image information inside the output block 931 region and the information outside the output block 931 (within the input block 911) are used. In one example embodiment, the image information within the region-of-interest (output block 931/input block 911) is considered to be related to (or inferable from) that of the surrounding region (input block 911/output block 931). In one embodiment, the output image blocks 931 are "patched" up or combined by the construction module 930 to generate the whole output details image, then the final result is obtained by combining the created details and the input image with the mixer 935 (FIG. 9).

Figure 11:
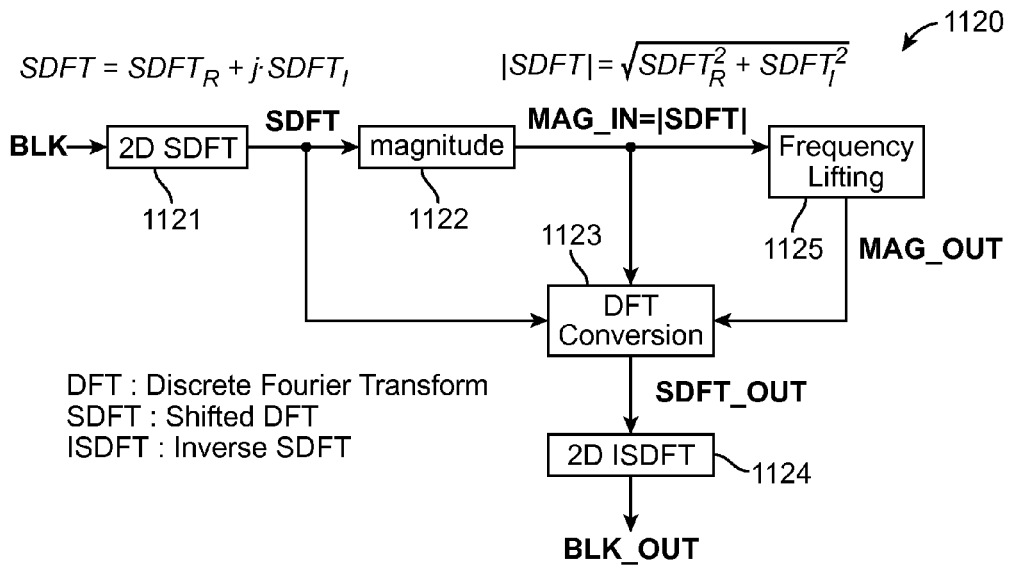
FIG. 11 shows an example detail creation block, according to an embodiment.

FIG. 11 shows an example detail creation block 1120 that may be implemented in system 900 as the detail creation module 920, according to an embodiment. In one embodiment, the detail creation block 1120 may include a 2D shifted discrete Fourier transform (SDFT) module 521 that receives an input image block from the receiving module 910 (FIG. 9), a magnitude module 1122, a DFT conversion module 1123, a frequency lifting module 1125 and a 2D inverse SDFT (ISDFT) module 1124 that outputs the output image block that is input to the construction module 930.

Figure 12:
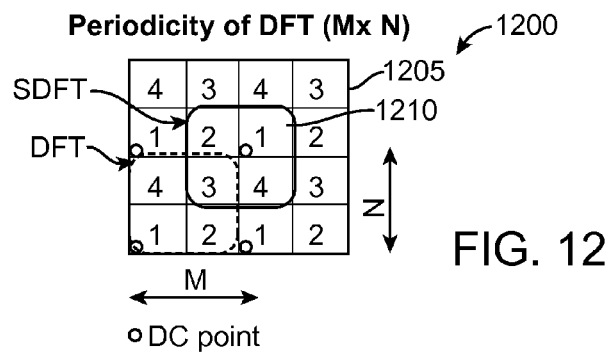
FIG. 12 shows an example of periodicity for a transform, according to an embodiment.
Figure 13:
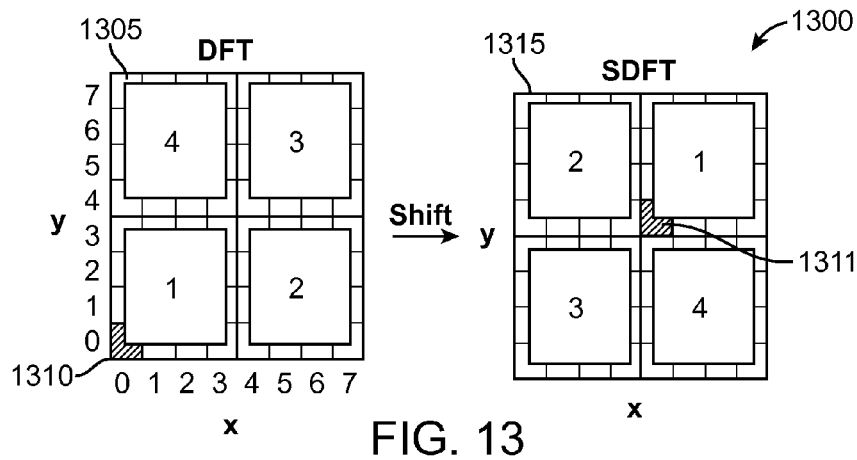
FIG. 13 shows an example transform shifting operation, according to an embodiment.

In one embodiment, the input image blocks are first processed in the 2D SDFT module 1121 to compute the DFT coefficients (in a matrix), which are then shifted. In one embodiment, the shifting of the DFT coefficients is illustrated in FIGS. 12 and 13 as described below. In one embodiment, the shifted DFT coefficients are provided as the input to the frequency lifting module 1125, and DFT conversion module 1123 for distance calculation, coefficient frequency lifting and coefficient conversion, respectively. It should be noted that the shifted DFT (SDFT) is a complex number which may be represented as $SDFT=SDFT_R+j \cdot SDFT_I$, and then the magnitude of the SDFT is calculated (MAG_IN) as $|SDFT|=(SDFT_R^2+SDFT_I^2)^{1/2}$, or MAG_IN=|SDFT|, where R represents the real portion and I represents the imaginary portion. Inside the frequency lifting module 1125, each DFT coefficient's (a component in a frequency domain, equivalent to a point in a 2D coordinate) distance to a zero-frequency coefficient (equivalent to the origin of the 2D coordinate) is obtained by using the coefficient's row and column indexes (equivalent to the coordinates of a point) in a matrix. In one embodiment, the computed distances are fed as input to two processing sub-blocks: the coefficient conversion module 1123 and the frequency lifting module 1125.

In one embodiment, in the frequency lifting module 1125, some (e.g., one or more, several, all, etc.) frequency components are lifted to a higher frequency location in the spectrum. In one example embodiment, if the 2D DFT coefficients/spectrum are plotted as a curved surface in a 3D Cartesian coordinate (the origin represents the zero-frequency position), the frequency lifting processing makes the off-center peaks move outward from the origin and makes the slope of the central peak expand outward. The details of the frequency lifting module 1125 processing are described below with reference to FIGS. 12-15. In one embodiment, the coefficient conversion module 1123 receives the outputs from the three processing blocks: the 2D SDFT module 1121, the magnitude module 1122 and the frequency lifting module 1125, and computes the new/modified 2D DFT coefficients. The computation details of the coefficient conversion module 1123 are described below.

In one embodiment, in the 2D ISDFT, the new 2D DFT coefficients are first shifted and then inversely transformed to a spatial domain signal—with the modified image block (size M×N), which is also the output of the detail creation block 1120 (as implemented as the detail creation module 920, FIG. 9).

FIG. 12 shows an example 1200 of a matrix 1205 of periodicity for a transform, according to an embodiment. In one embodiment, the matrix 1200 is an M×N matrix. In one example, the DFT coefficients have an origin in the lower left corner of each group of coefficients for distance calculation (DC). In one embodiment, the SDFT shifts the origin to the center of the SDFT block 1210.

FIG. 13 shows an example 1300 of transform shifting operation, according to an embodiment. In one embodiment, example 1300 illustrates the shifting of DFT coefficients for the purpose of computing the distance of a frequency domain component to the zero frequency point. In one example, 2D DFT is generally achieved through a 2D FFT (Fast Fourier Transform) algorithm which generates the DFT coefficients in a matrix format as shown in example 1300 as the DFT matrix 1305 and the SDFT matrix 1315. In one example embodiment, each matrix element is a frequency component. The x, y coordinates represent the column and row indices, respectively. In one example embodiment, for the DFT coefficient matrix 1305 that is not shifted, the four corner elements contribute to the zero-frequency component.

In one example, to illustrate the coefficient shifting, the coefficient matrix is evenly divided into four (4) regions as shown in the DFT matrix 1305 graph and the SDFT matrix 1315 graph. In one example embodiment, after coefficient shifting, the new coefficient matrix (SDFT matrix 1315) may be considered to be obtained by exchanging the four regions' positions. In one example embodiment, region 1 exchanges its position with region 3, while region 2 exchanges its position with region 4. In one embodiment, the coefficient shifting moves the zero-frequency position 1310 to the center of the matrix 1311 (equivalent to the origin of a 2D coordinate), which may simplify the distance calculation and also make the frequency lifting module 1125 processing easier to understand.

Figure 14:
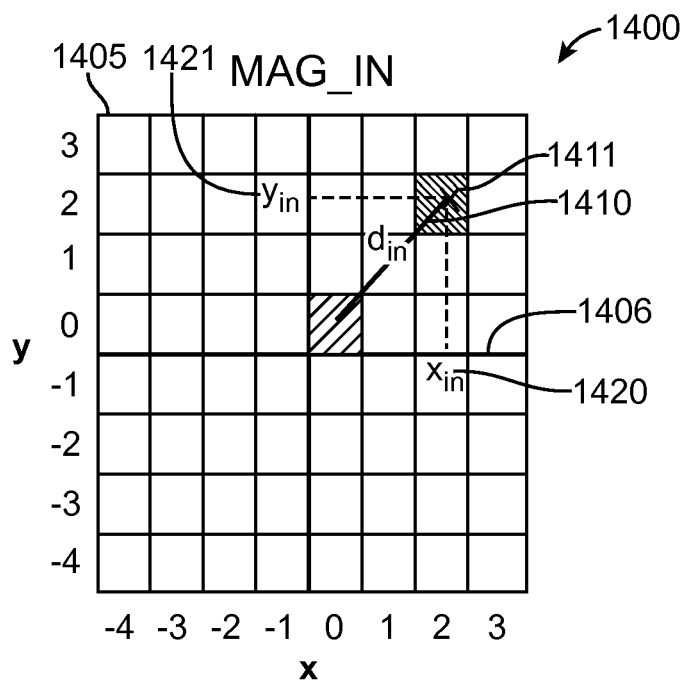
FIG. 14 shows an example diagram for a distance calculation, which is related to the frequency component, according to an embodiment.

FIG. 14 shows an example diagram 1400 for describing a distance calculation, according to an embodiment. After DFT coefficients shifting, the zero-frequency is moved to the center of the matrix 1405. Inside the frequency lifting module 1125, the distance 1410 from a frequency component 1411 to the zero-frequency point in the quadrant 1406 needs to be calculated first. The zero-frequency point is treated as the origin of a 2D coordinate and the matrix elements as the points on the coordinate. In one example, the position of the coefficient 1411 is indicated by $x_{in}$ 1420 and $y_{in}$ 1421. In one embodiment, for a frequency component's position, the coordinates of the corresponding point, are obtained as in the equation $x_{in}$=Col−Col(0), $y_{in}$=Row−Row(0).

Figure 15:
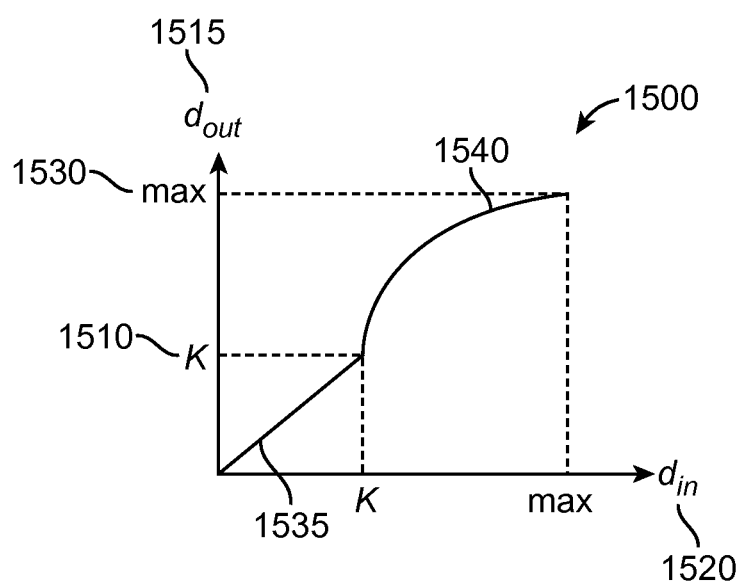
FIG. 15 shows an example diagram for a transfer function for frequency lifting, according to an embodiment.

FIG. 15 shows an example diagram 1500 for a transfer function for frequency lifting, according to an embodiment. In one example embodiment, in the equation $x_{in}$=Col−Col(0), $y_{in}$=Row−Row(0), $x_{in}$ and $y_{in}$ are the coordinates of a frequency component while Col and Row are its matrix indices. Similarly, Col(0) and Row(0) are the matrix indices of the zero-frequency component.

In one embodiment, after DFT coefficients shifting, the zero-frequency is moved to the center of the matrix. In one embodiment, to calculate the distance from a frequency component to the zero-frequency point, the zero-frequency point is treated as the origin (i.e., (0,0) point) of a 2D coordinate and the matrix elements as the points on the coordinate as illustrated in FIG. 15 as an example with M=N=8. Note that the indices of the MAG_IN matrix becomes $$x_{in} = -\frac{N}{2}, \ldots, 0, \ldots, \frac{N}{2} - 1$$

and $$y_{in} = -\frac{M}{2}, \ldots, 0, \ldots, \frac{M}{2} - 1,$$

where it is assumed that N and M are even numbers, and the same for the MAG_OUT matrix indices. In one embodiment, for all $$x_{in} = -\frac{N}{2}, \ldots, 0, \ldots, \frac{N}{2} - 1$$

and $$y_{in} = -\frac{M}{2}, \ldots, 0, \ldots, \frac{M}{2} - 1,$$

the distance $d_{in}$ 1520 to zero-frequency coefficient is calculated as follows $$d_{in} = \sqrt{x_{in}^2 + y_{in}^2}$$

In one embodiment, the frequency lifting module 1125 (FIG. 11) lifts the frequency components to higher frequency positions based on their distances to zero-frequency (the origin in FIG. 8) component. However, if the matrix element is considered as the arrow head of a vector, the frequency lifting operation does not change the direction of the vector. In one embodiment, only the vector's length (the frequency component's distance to the origin) may be increased. Basically, this distance $d_{out}$ 1515 change may be mathematically expressed as follows $$d_{out} = \text{curve}(d_{in}).$$

In one embodiment, the 'curve' in above formula is a pre-determined transfer function, a typical example of which is shown as curve 1540 that is plotted in the graph 1500. In one example embodiment, the x/horizontal axis represents the input distance $d_{in}$ 1520 and the y/vertical axis represents the output distance $d_{out}$ 1515. In one embodiment, the transfer function may be created using a piecewise function as shown as the line 1535 and curve 1540. In one example embodiment, when the input distance $d_{in}$ 1520 is smaller than a value K 1510, the distance will not be changed. Therefore, in one example the straight line 1535 has a slope of 1. In one example embodiment, when the input distance $d_{in}$ 1520 is larger than K 1510, the output distance $d_{out}$ 1515 will be increased and be larger than $d_{in}$ 520. In one example embodiment, the distance increase may be determined by a nonlinear function, e.g., a 2nd-order polynomial function. In one example embodiment, the highest-frequency component, which has the maximum distance 1530, will not be lifted. In a normal 2D DFT spectrum, the lower-frequency components (matrix elements closer to the center) generally have a high value (the magnitude of a DFT component) than higher-frequency components. Therefore, in one example embodiment when a lower-frequency component is lifted to a higher-frequency position, the high-frequency information is created. In one embodiment, new high-frequency information (new image details) may be created to restore the missing/damaged image details. In one embodiment, as the high-frequency components are created or inferred from the low-frequency information, the new image details look more 'real' or 'meaningful' and may contain less artifacts compared to conventional super resolution (SR) methods.

In one embodiment, after a frequency component is lifted to a higher frequency position, its new position (coordinates) may be determined in the following equations:

$$x_{out} = x_{in} * \frac{d_{out}}{d_{in}}$$

$$y_{out} = y_{in} * \frac{d_{out}}{d_{in}},$$

which is to lift the DFT frequency components into the same angle. Note that $$\frac{y_{in}}{x_{in}} = \frac{y_{out}}{x_{out}}.$$

It should be noted that the new coordinates or the new positions are usually not the correct coordinates or positions defined by the DFT coefficient matrix. Therefore, in one example embodiment, 2D interpolation or re-sampling is used to compute the DFT coefficient on the 'right' positions based on the shifted grid and modified DFT values. Once the target horizontal and vertical frequency components have been calculated, the frequency components from MAG_IN are updated to MAG_OUT by the frequency lifting module 1125 (FIG. 11) process (or frequency component mapping) by the equation below:

MAG_OUT($x_{out}, y_{out}$)=MAG_IN($x_{in}, y_{in}$).

In one embodiment, it may be easily understood that the above equation represents a mapping process among different frequency positions (locations) in the frequency domain. The mapping may be either backward or forward interpolation, to interpolate a new pixel frequency magnitude (MAG_OUT) by nearest neighbor pixel or weighted neighbor pixels from the input frequency magnitude block. In one embodiment, after obtaining the enhanced frequencies, a ratio may be calculated with the enhanced frequency and the original frequency at that location. In one example embodiment, then the enhanced DFT (including both real and imaginary parts) may be obtained by multiplying the ratio to the SDFT result as follows:

$$\text{SDFT\_OUT} = SDFT \frac{\text{MAG\_OUT}}{\text{MAN\_IN}}.$$

In one embodiment, a modified matrix of DFT coefficients is obtained through the frequency lifting process of the frequency lifting module 1125 (FIG. 11). In one example embodiment, before the matrix may be transformed back to an image block in spatial domain through the ISDFT module 1124, its elements need to be shifted in the opposite way of the one shown in FIG. 13.

Figure 16:
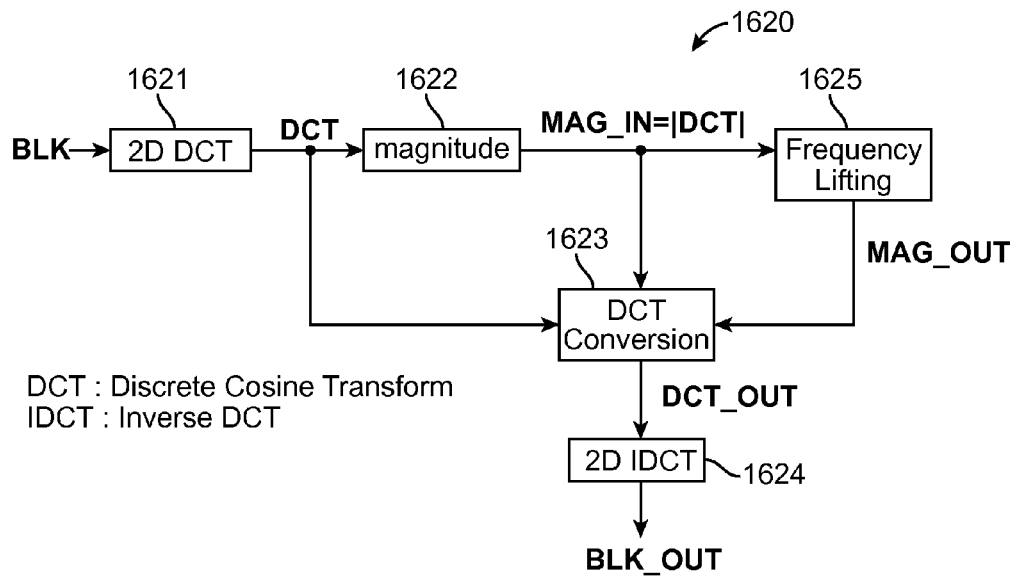
FIG. 16 shows another example detail creation block, according to an embodiment.

FIG. 16 shows another example detail creation block 1620, according to an embodiment. In one embodiment, the detail creation block 1620 may be implemented in the detail creation module 920 (FIG. 9). In one example embodiment, the detail creation block 1620 implements a DCT process. In one embodiment, the detail creation block 1620 includes a 2D DCT module 1621, a magnitude module 1622, a frequency lifting module 1625, a DCT conversion module 1623 and 2D inverse DCT (2D IDCT) module 1624.

Figure 17:
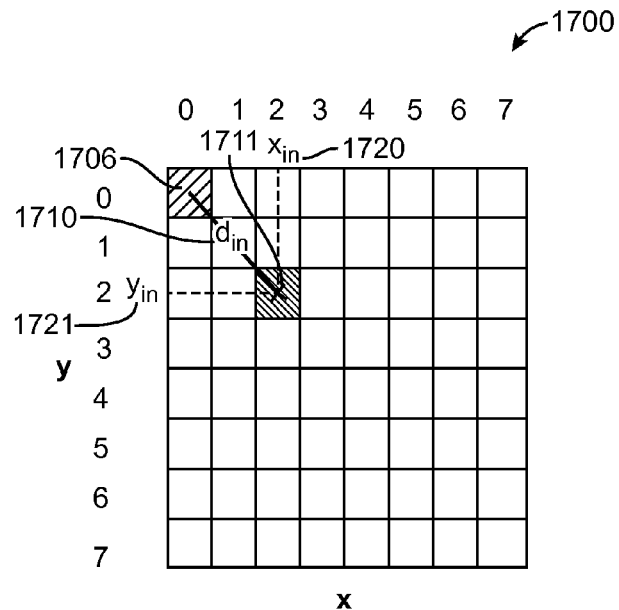
FIG. 17 shows an example diagram for depicting a distance determination that is related to the frequency component, according to an embodiment.

In one embodiment, the main function of the frequency lifting module 1625 is to lift the given frequency in MAG_IN and generate the lifted DCT magnitude matrix DCT_OUT. In one example embodiment, for all $x_{in}$=0, 1, . . . , M−1 and $y_{in}$=0, 1, . . . N−1, the distance to the zero-frequency coefficient (equivalent to the origin of the 2D coordinate) is calculated using the coefficient's row and column indexes (equivalent to the coordinates of a point) as:

$$d_{in} = \sqrt{x_{in}^2 + y_{in}^2},$$

which is related the frequency component (e.g., as depicted in FIG. 17).

Inside the frequency lifting module 1625, the distance is fed as input to the transfer function to decide the upper target lifting frequency distance to zero-frequency component as $$d_{out} = \text{curve}(d_{in}),$$

where curve represents a monotonically increasing transfer function. In one example embodiment, the transfer function is shown in FIG. 15, which also shows that that frequency ranges are set up such as $d_{in} < K$ whose components are not lifted.

In one embodiment, once the target lifting factor has been calculated then the associated horizontal and vertical DCT frequency components are determined as follows:

$$x_{out} = x_{in} \cdot \frac{d_{out}}{d_{in}} \ \& \ y_{out} = y_{in} \cdot \frac{d_{out}}{d_{in}},$$

which is implemented to lift the DCT frequency components into the same angle. Note that $$\frac{y_{in}}{x_{in}} = \frac{y_{out}}{x_{out}}.$$

In one embodiment, once the target horizontal and vertical frequency components have been calculated, the frequency components are updated from MAG_IN to MAG_OUT by the frequency lifting module 1625 as:

$$\text{MAG\_OUT}(x_{out}, y_{out}) = \text{MAG\_IN}(x_{in}, y_{in}).$$

Note that, in the frequency lifting module 1625, some (e.g., one or more, several, all, etc.) frequency components are lifted to a higher frequency location in the spectrum. In one example embodiment, if the 2D DCT coefficients/spectrum are plotted as a curved surface in a 3D Cartesian coordinate (the origin represents the zero-frequency position), the frequency lifting processing makes the off-center peaks move outward from the origin and make the slope of the central peak expand outward.

In one embodiment, MAG_IN and MAG_OUT from the frequency lifting module 1625 are then provided to the DCT conversion module 1623, whose output is:

$$\text{DCT\_OUT} = DCT \cdot \frac{\text{MAG\_OUT}}{\text{MAG\_IN}}.$$

In one embodiment, in the 2D IDCT module 1624, the new 2D DCT coefficients (DCT_OUT) are inversely transformed to spatial domain signal—the same size block as BLK (M×N), which is the output of the detail creation module 920 (FIG. 9).

FIG. 17 shows an example diagram 1700 for depicting a distance determination that is related to the frequency component, according to an embodiment. In one example embodiment, the operation of the DCT conversion module 1623 (FIG. 16) is to combine the original phase information with the magnitude change. In one embodiment, the 2D origin 1706 for the x and y coordinates is used to determine the distance $d_{in}$ 1710 to the coefficient 1711 based on $x_{in}$ 1720 and $y_{in}$ 1721.

Figure 18:
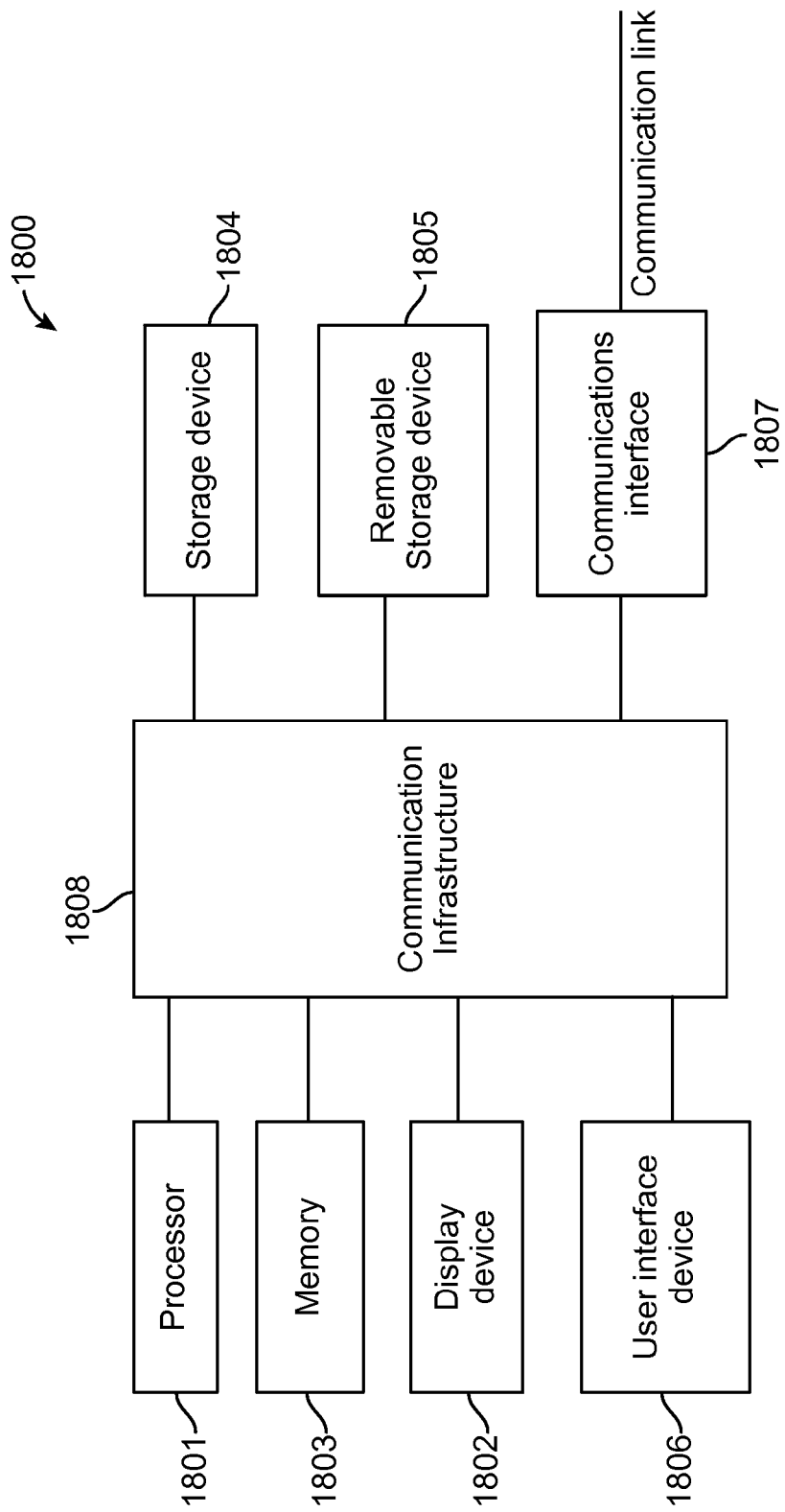
FIG. 18 is an exemplary high-level block diagram showing an information processing system comprising a computer system useful for implementing disclosed embodiments.

FIG. 18 is a high-level block diagram showing an information processing system comprising a computer system 1800 useful for implementing the disclosed embodiments. The computer system 1800 includes one or more processors 1801, and can further include an electronic display device 1802 (for displaying graphics, text, and other data), a main memory 1803 (e.g., random access memory (RAM)), storage device 1804 (e.g., hard disk drive), removable storage device 1805 (e.g., removable storage drive, removable memory module, a magnetic tape drive, optical disk drive, computer readable medium having stored therein computer software and/or data), user interface device 1806 (e.g., keyboard, touch screen, keypad, pointing device), and a communication interface 1807 (e.g., modem, a network interface (such as an Ethernet card), a communications port, or a PCMCIA slot and card). The communication interface 1807 allows software and data to be transferred between the computer system and external devices. The system 1800 further includes a communications infrastructure 1808 (e.g., a communications bus, cross-over bar, or network) to which the aforementioned devices/modules 1801 through 1807 are connected.

Information transferred via communications interface 1807 may be in the form of signals such as electronic, electromagnetic, optical, or other signals capable of being received by communications interface 1807, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Furthermore, the computer readable medium may comprise computer readable information in a transitory state medium such as a network link and/or a network interface, including a wired network or a wireless network, that allow a computer to read such computer readable information. Computer programs (i.e., computer control logic) are stored in main memory and/or secondary memory. Computer programs may also be received via a communications interface. Such computer programs, when executed, enable the computer system to perform the features as discussed herein. In particular, the computer programs, when executed, enable the processor multi-core processor to perform the features of the computer system. Such computer programs represent controllers of the computer system.

Though the embodiments have been described with reference to certain versions thereof; however, other versions are possible. Therefore, the spirit and scope of the appended claims should not be limited to the description of the preferred versions contained herein.

What is claimed is:

1. A method comprising:
receiving input image information;
using a processor device for determining enhancement information based on frequency characteristics and feature information of the input image information, wherein determining enhancement information comprises performing a frequency lifting process on transform coefficients based on determined distances for lifting one or more frequency components to a higher frequency location in a transform spectrum; and
mixing the enhancement information with the input image information to generate an enhanced image,
wherein edge information and texture information of the input image are used for adjusting the frequency lifting process.

2. The method of claim 1, further comprising:
receiving an input image; and
processing the input image to obtain image information;
wherein determining enhancement information further comprises:
performing the frequency lifting process on the input image information using the processor device, wherein the frequency lifting process results in a frequency lifted output image;
performing image feature detection on the input image;
performing map estimation using detected image features to obtain a gain control value; and
providing the enhanced image as a final output image using the gain control value, the input image and the frequency lifted output image.

3. The method of claim 2, further comprising:
using the processor device for transforming the input image information for obtaining frequency domain information;
performing an inverse transformation on the frequency components for creating one or more output image blocks; and
combining the one or more output image blocks to create lifted image details, and mixing the lifted image details to the input image to obtain the frequency lifted output image.

4. The method of claim 3, wherein the frequency domain information comprises transform coefficients, and the frequency components are created based on:
performing frequency lifting on the transform coefficients for lifting one or more frequency components to a higher frequency location in a transform spectrum; and
converting the transform coefficients to modified transform coefficients.

5. The method of claim 3, wherein the frequency domain information comprises transform coefficients, and the frequency components are created based on:
shifting the transform coefficients position in a matrix;
using the shifted transform coefficients for determining distances for coefficients to a zero-frequency coefficient position using associated coefficient row and column indexes; and
performing the frequency lifting on the transform coefficients based on the determined distances for lifting the one or more frequency components to the higher frequency location in the transform spectrum; and
converting the transform coefficients to modified transform coefficients.

6. The method of claim 5, further comprising:
moving the zero-frequency coefficient position to a center of the matrix after said shifting, wherein the zero-frequency coefficient position is used as an origin of a two-dimensional coordinate, and matrix elements are used as points on the two-dimensional coordinate,
wherein determining distances for the coefficients is based on a pre-determined transfer function, and transforming received input image information comprises using one of discrete Fourier transform processing and discrete cosine transform processing.

7. The method of claim 2, wherein performing image feature detection on the input image comprises detecting one or more of edge information, texture information and structure information for the input image, and wherein performing the frequency lifting process comprises lifting-up the frequency components while maintaining a shape of an original frequency distribution.

8. The method of claim 7, wherein performing map estimation using detected image features comprises:
using detected edge information and detected texture information to generate the gain control value.

9. The method of claim 7, wherein performing map estimation using detected image features comprises:
using detected edge information and detected structure information to generate a first map; and
using the first map and the detected texture information to generate a second map that comprises the gain control value.

10. The method of claim 2, wherein:
the final output image is displayed on an electronic device;
the electronic device comprises one of a television device, a monitor device, a computing device and a mobile computing device; and
the processor device performs processing on one of a local television device, a set-top-box device, and a network server device.

11. A system comprising
an image feature detection module that obtains feature information for an input image;
an image processing module that uses a processor device for:
receiving input image information; and
determining enhancement information based on the feature information and frequency characteristics of the input image information, wherein determining enhancement information comprises performing a frequency lifting process on transform coefficients based on determined distances for lifting one or more frequency components to a higher frequency location in a transform spectrum; and
a mixer module that mixes the enhancement information with the input image, wherein edge information and texture information of the input image are used for adjusting the frequency lifting process.

12. The system of claim 11, further comprising:
a control gain map estimation module that uses the feature information from detected image features to obtain a gain control value; and
a frequency lifting module that uses a processor device for:
performing the frequency lifting process on image information using the processor device, wherein the frequency lifting process results in a frequency lifted output image;
wherein the mixing module generates a final output image based on the gain control value, the input image and the frequency lifted output image.

13. The system of claim 12, wherein the frequency lifting module:
uses the processor device for transforming the input image information to obtain frequency domain information;
performs an inverse transformation on the frequency components to create one or more output image blocks;
combines the one or more output image blocks to create lifted image details; and
mixes the lifted image details to the input image to obtain the frequency lifted output image.

14. The system of claim 13, wherein the frequency domain information comprises transform coefficients, and the frequency components are created by the frequency lifting module that further:
converts the transform coefficients to modified transform coefficients.

15. The system of claim 13, wherein the frequency domain information comprises transform coefficients, and the frequency components are created by the frequency lifting module that further:
shifts the transform coefficients position in a matrix;
uses the shifted transform coefficients to determine distances for coefficients to a zero-frequency coefficient position using associated coefficient row and column indexes;
performs frequency lifting on the transform coefficients based on the determined distances; and
converts the transform coefficients to modified transform coefficients.

16. The system of claim 15, wherein the frequency lifting module further moves the zero-frequency coefficient position to a center of the matrix after shifting the transform coefficients position in the matrix, wherein the zero-frequency coefficient position is used as an origin of a two-dimensional coordinate, and matrix elements are used as points on the two-dimensional coordinate.

17. The system of claim 16, wherein the image feature detection module detects one or more of edge information, texture information and structure information for the input image.

18. The system of claim 17, wherein the control gain map estimation module uses detected edge information and detected texture information to generate the gain control value.

19. The system of claim 17, wherein the control gain map estimation module uses detected edge information and detected structure information to generate a first map, and uses the first map and the detected texture information to generate a second map that comprises the gain control value.

20. The system of claim 12, wherein:
the final output image is displayed on an electronic device;
the electronic device comprises one of a television device, a monitor device, a computing device and a mobile computing device; and
the processor device performs processing on one of a local television device, a set-top-box device, and a network server device.

21. A non-transitory computer-readable medium having instructions which when executed on a computer performs a method comprising:
receiving input image information;
using a processor device for determining enhancement information based on frequency characteristics and feature information of the input image information, wherein determining enhancement information comprises performing a frequency lifting process on transform coefficients based on determined distances for lifting one or more frequency components to a higher frequency location in a transform spectrum; and
mixing the enhancement information with the input image information to generate an enhanced image,
wherein edge information and texture information of the input image are used for adjusting the frequency lifting process.

22. The medium of claim 21, further comprising:
processing an input image to obtain the input image information;
wherein determining enhancement information comprises:
performing the frequency lifting process using the processor device, wherein the frequency lifting process results in a frequency lifted output image;

performing image feature detection on the input image;

performing map estimation using the feature information from detected image features to obtain a gain control value; and providing a final output image using the gain control value, the input image and the frequency lifted output image.

23. The medium of claim 22, further comprising:

transforming the image information for obtaining frequency domain information;

performing an inverse transformation on the frequency components for creating one or more output image blocks;

combining the one or more output image blocks to create lifted image details, and mixing the lifted image details with the input image to obtain the frequency lifted output image.

24. The medium of claim 23, wherein the frequency domain information comprises transform coefficients, and the frequency components are created based on:

performing the frequency lifting on the transform coefficients for lifting the one or more frequency components to the higher frequency location in the transform spectrum; and converting the transform coefficients to modified transform coefficients.

25. The medium of claim 23, wherein the frequency domain information comprises transform coefficients, and the frequency components are created based on:

shifting the transform coefficients position in a matrix;

using the shifted transform coefficients for determining distances for coefficients to a zero-frequency coefficient position using associated coefficient row and column indexes;

performing the frequency lifting on the transform coefficients based on the determined distances for lifting the one or more frequency components to the higher frequency location in the transform spectrum; and converting the transform coefficients to modified transform coefficients.

26. The medium of claim 25, further comprising:

moving the zero-frequency coefficient position to a center of the matrix after said shifting, wherein the zero-frequency coefficient position is used as an origin of a two-dimensional coordinate, and matrix elements are used as points on the two-dimensional coordinate, wherein determining distances for the coefficients is based on a pre-determined transfer function, and transforming received image information comprises using one of discrete Fourier transform processing and discrete cosine transform processing.

27. The medium of claim 22, wherein performing image feature detection on the input image comprises detecting one or more of edge information, texture information and structure information for the input image, and wherein performing the frequency lifting process comprises lifting-up the frequency components while maintaining a shape of an original frequency distribution.

28. The medium of claim 27, wherein performing map estimation using detected image features comprises:

using detected edge information and detected texture information to generate the gain control value.

29. The medium of claim 27, wherein performing map estimation using detected image features comprises:

using detected edge information and detected structure information to generate a first map; and using the first map and the detected texture information to generate a second map that comprises the gain control value.

30. The medium of claim 22, wherein:

the final output image is displayed on an electronic device;

the electronic device comprises one of a television device, a monitor device, a computing device and a mobile computing device; and the computer performs processing on one of a local television device, a set-top-box device, and a network server device.

* * * * *